United States Patent [19]

Katagiri et al.

[11] Patent Number: 5,662,854
[45] Date of Patent: Sep. 2, 1997

[54] METHOD FOR MANUFACTURING A MAGNETIC TAPE CASSETTE ACCOMMODATING CASE

[75] Inventors: Shingo Katagiri; Teruo Ashikawa; Kiyoo Morita, all of Kanagawa, Japan

[73] Assignee: Fuji Photo Film Co., Ltd., Kanagawa, Japan

[21] Appl. No.: 141,746

[22] Filed: Oct. 27, 1993

Related U.S. Application Data

[62] Division of Ser. No. 845,604, Mar. 4, 1992, Pat. No. 5,323,904.

Foreign Application Priority Data

Mar. 5, 1991 [JP] Japan .................................. 3-18693 U
Apr. 12, 1991 [JP] Japan .................................. 3-106510

[51] Int. Cl.⁶ .............................. B29C 33/76; B29C 45/17; B29C 45/33
[52] U.S. Cl. ...................... 264/255; 264/294; 264/328.7; 264/328.8
[58] Field of Search ................................ 264/40.1, 255, 264/328.7, 328.8, 328.9, 250, 259, 294; 425/573, 577, 121, 125

[56] References Cited

U.S. PATENT DOCUMENTS

| | | | |
|---|---|---|---|
| 4,726,758 | 2/1988 | Sekine et al. | 264/328.8 |
| 5,094,602 | 3/1992 | Morita | 264/328.8 |
| 5,097,952 | 3/1992 | Katagiri | 264/328.8 |
| 5,125,816 | 6/1992 | Morita | 264/328.7 |
| 5,192,481 | 3/1993 | Morita | 264/255 |
| 5,342,002 | 8/1994 | Morita | 264/328.9 |
| 5,372,770 | 12/1994 | Machida | 264/255 |
| 5,385,461 | 1/1995 | Machida | 264/255 |

*Primary Examiner*—Angela Ortiz
*Attorney, Agent, or Firm*—Sughrue, Mion, Zinn, Macpeak & Seas

[57] ABSTRACT

A magnetic tape cassette accommodating case has a cover member having a pocket for receiving one end portion of a magnetic tape cassette and a casing member having rotation stopper projections. At least (a) peripheral portions of the cover member and the casing member, which edge portions confront at least the thickened portion of the magnetic tape cassette, and (b) side wall portions of the cover member and the casing member, the side wall portions including the pivotably assembled portions, are molded with a resin, which is more slidable than the other portions of the cover member and the casing member. The other portions are molded with such a transparent resin as to allow the case to be seen through. A method for manufacturing such a magnetic tape cassette accommodating cage utilizes a first slide core slidable in a direction of inserting a cassette, and a second slide core movable substantially orthogonal to the direction of moving the first slide core.

8 Claims, 5 Drawing Sheets

METHOD FOR MANUFACTURING A MAGNETIC TAPE CASSETTE ACCOMMODATING CASE

This is a divisional of application Ser. No. 07/845,604 filed Mar. 4, 1992, now U.S. Pat. No. 5,323,904.

BACKGROUND OF THE INVENTION

The invention relates to a magnetic tape cassette accommodating case, and more particularly to an improvement of a case for accommodating magnetic tape cassettes, such as audio magnetic tape cassettes, for their storage.

A magnetic tape cassette used for audio, etc., is usually stored in a protecting case when not in use. A magnetic tape cassette has front opening portions into which a magnetic head, etc., is inserted when the cassette is in use in a recording/reproducing apparatus. The cassette stores a magnetic tape therein so that part of the magnetic tape can be traversed along the front opening portions.

The front opening portions of the cassette allow entry of foreign matter such as dust. When dust sticks to the magnetic tape, the recording/reproducing performance may be impaired. Moreover, since the housing of the cassette is molded with a synthetic resin, it may be broken when impacted or dropped. For these reasons, cassettes should be stored in an appropriate case.

A cassette accommodating case consists basically of a cover member having a pocket that receives an end portion of a cassette and a casing member that is pivotably attached to the cover member so as to be opened and closed like a door. The cover member and the casing member are integrally formed with each other using a synthetic resin.

As a synthetic resin for forming the case, polystyrene resin (GPPS) of a common type, which is not only highly transparent but also inexpensive, has often been used. The highly transparent material allows the cassette accommodated in the case and an index card inserted therein together with the cassette to be observed from outside the case.

Although the cassette accommodating case molded with GPPS has the advantage that it is highly transparent, its hardness and surface rigidity are low. For this reason, the pivotably assembled portion and the fitted and held portions are subjected to wear as the case is repetitively opened and closed, and scrapings are produced due to the case being rubbed against the accommodated cassette when storing the cassette or carrying the case. Since the scrapings are a fine powder, they are easily diffused irregularly inside the case, and they tend to adhere to the surface of the magnetic tape exposed at the front opening portions of the cassette. As a result, recording and reproduction cannot be adequately performed on the portion of the tape to which the scrapings have been adhered due to the resulting "dropout" of the reproduction output.

Further, if the case is formed of a highly wear-resistant resin, or a slidable resin, etc., to prevent the production of such scrapings, these resins, generally being low in transparency, do not allow the index card placed inside the case to be observed from outside the case.

A conceivable solution is to selectively use a highly transparent resin and a highly wear-resistant resin. However, in a case that is selectively made of different materials, the respective parts must be molded separately, and the molded parts must be assembled thereafter using an adhesive or the like, making the productivity extremely low.

It has been considered to mold such a case by means of two color molding. However, the molding of the cover member has proved particularly difficult, as will be described with reference to FIG. 6 which is a sectional view showing a mold for molding the cover member.

The injection molding of the cover member 52 (see FIG. 5) will be described with reference to FIG. 6. To mold the cover member 52, a cavity (injection space) is formed between a fixed mold 70 and two movable molds 71, 72 (reference numeral 72 designates a slide core).

After injecting a desired resin into a cavity formed by the respective molds, the resin is appropriately solidified, and the movable molds 71, 72 are moved in directions (directions A and B shown in FIG. 6) so as to release the molds from the fixed mold 70 to form the cover 52. In releasing the molds, the mold 72 must be slid in the direction B so as to pull out its portion located at the inner portion of the pocket to allow the molded product to be released from the molds.

With such an arrangement being a requirement for the molding process, if central portions A (see FIG. 5) of the cover member 52 and its shaded, portions B are to be molded with different resins, another slide core corresponding to the central portions A must also be provided, which slide core must be slidable within the mold 72.

However, since the mold 72 slides in the direction B, it is extremely difficult to drive the other slide core; i.e., moving the mold 72 generally requires that the slide core inside the mold 72 be pulled out from the mold 72 or that coupling between the slide core and the slide core drive device be released. Therefore, even if the slide core is movable, the method for moving the molds as well as the molding process is unavoidably complicated.

SUMMARY OF THE INVENTION

Accordingly, an object of the invention is to provide a two-color-molded cassette accommodating case which is excellent in protecting a cassette and which allows the accommodated cassette to be observed from outside the case.

It is a further object of the invention to provide a magnetic tape cassette accommodating case which allows a magnetic tape cassette to be easily observed and which can reduce the production of scrapings.

Another object of the invention is to provide a method for manufacturing such a case by means of two color molding that is featured by a simple and highly productive process. Still another object of the invention is to provide an apparatus permitting the cassette accommodating case to be manufactured by such a method.

The above and other objects of the invention can be achieved by a magnetic tape cassette accommodating case comprising a cover member having a pocket for receiving one end portion of a magnetic tape cassette and a casing member having rotation stopper projections, the cover member and the casing member being pivotably assembled. In such a magnetic tape cassette accommodating case, at least (a) peripheral portions of the cover member and the casing member, which peripheral portions confront at least the thickened portion of the magnetic tape cassette, and (b) side wall portions of the cover member and the casing member, the side wall portions including the pivotably assembled portions, are molded with a resin, which is more slidable than the other portions of the cover member and the casing member. The other portions are molded with a transparent resin so as to permit observation of the cassette through the case.

The transparent resin may include a synthetic resin such as GPPS, and the highly slidable resin may include a synthetic resin such as a resin prepared by adding silicon oil to high impact polystyrene (HIPS).

The above and other objects of the invention can also be achieved by a magnetic tape cassette accommodating case comprising a cover member having a pocket for receiving a portion of a magnetic tape cassette and a casing member confronting the cover member, the cover member and the casing member being pivotably assembled so as to be opened and closed freely. In such a magnetic tape cassette accommodating case, at least the core member is two-color molded by a mold using a slide core that is capable of moving substantially orthogonal to a direction of moving a slide core used for molding the pocket.

Further, the above and other objects of the invention can be achieved by a method for forming magnetic tape cassette accommodating case comprising a cover member having a pocket for receiving a portion of a magnetic tape cassette and a casing member confronting the cover member, the cover member and the casing member being pivotably assembled so as to be opened and closed freely. In such a method, a first slide core defining inner wall surfaces of a cavity for forming the cover member is provided so as to be slidable in a direction of inserting a cassette, and a second slide core is provided so as to be movable substantially orthogonally to the direction of moving the first slide core. The method comprises the steps of: projecting the second slide from the first slide core into a cavity and injecting a first resin into the cavity, retracting the second slide core to form another cavity and injecting a second resin into another cavity, thereafter causing the first slide core to slide, together with the second slide core, to a position of pulling out an inner portion produced by having formed the pocket, and then causing the first slide core to eject the cover member from the mold.

The above and other objects of the invention further can be achieved by an apparatus for manufacturing a magnetic tape cassette accommodating case comprising a cover member having a pocket for receiving a portion of a magnetic tape cassette and a casing member confronting the cover member, the cover member and the casing member being pivotably assembled so as to be opened and closed freely, the apparatus comprising: a first slide core that is movable in a direction corresponding to a direction of inserting a cassette, the first slide core defining inner side wall surfaces of a cavity for forming the cover member; and a second slide core that is movable in a direction substantially orthogonal to the direction of moving the first slide core within the first slide core. In such an apparatus, an engaged portion between a lower end portion of the second slide core and means for driving the second slide core allows a core side engaging portion and a drive side engaging portion to be slidably engaged with each other, the core side engaging portion having a slide engaging surface extending along the direction of moving the first slide core and the drive engaging portion having a confronting engaging surface to be engaged with the slide engaging surface.

DESCRIPTION OF THE PREFERRED EMBODIMENTS

Preferred embodiments of the invention will hereunder be described in detail with reference to the accompanying drawings.

Figure 5:
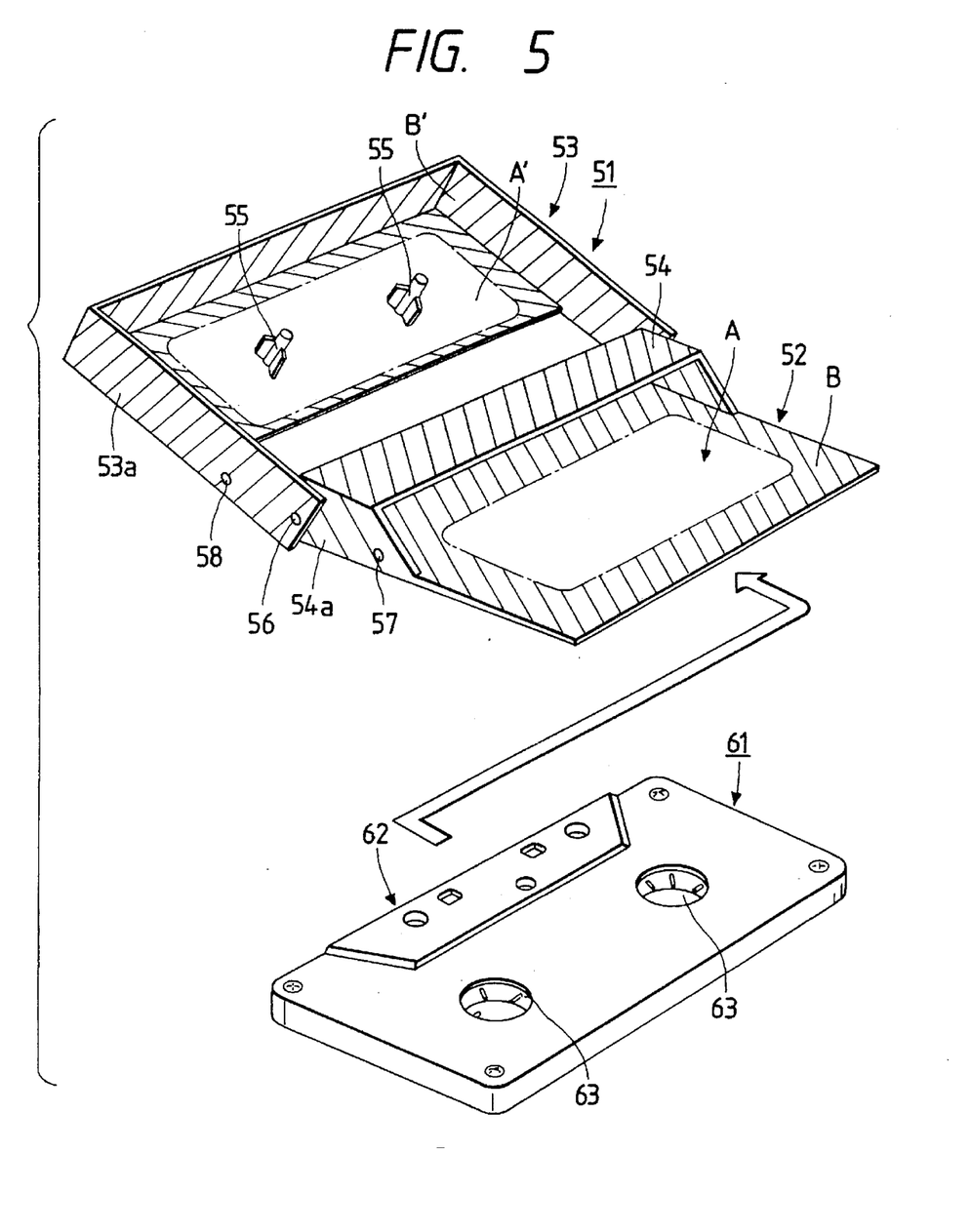
FIG. 5 is a perspective view showing a magnetic tape cassette accommodating case produced in accordance with a preferred embodiment of the present invention, and a magnetic tape cassette.
Figure 6:
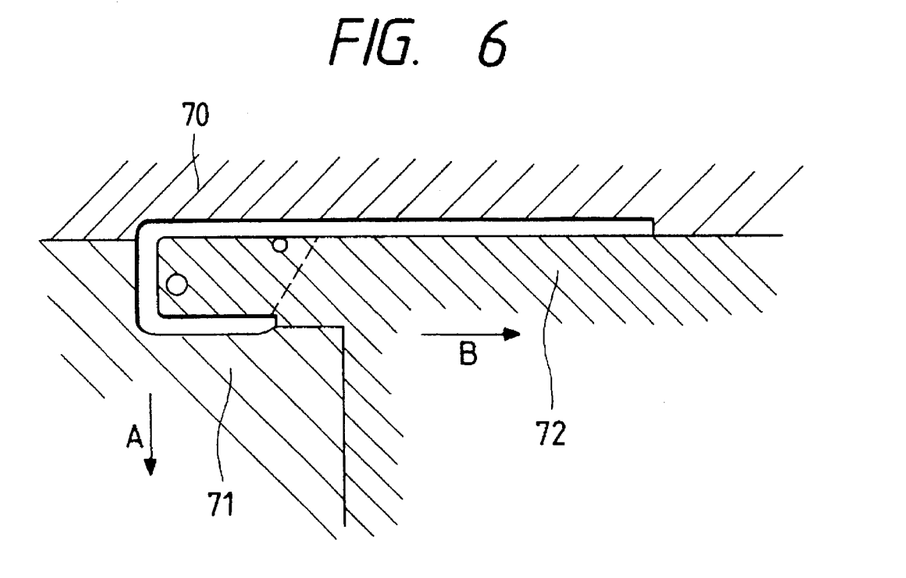
FIG. 6 is a sectional view of molds used to form a conventional magnetic tape cassette accommodating case.

FIG. 5 is a perspective view showing a magnetic tape cassette accommodating case and a magnetic tape cassette. The magnetic tape cassette accommodating case 51 is composed of a cover member 52 having a pocket 54 and a casing member 53 having a pair of rotation stopper projections 55. Pivots 56 arranged on the inner surfaces of right and left side wall portions 53a of the casing member 53 are fitted with fitting holes 56 arranged on right and left side wall portions 54a of the pocket 54, respectively, so that the cover member 52 and the casing member 53 can be opened and closed as a door.

The pocket 54 is provided to receive the thickened portion (on the side of the front opening portions 62) of a magnetic tape cassette 61, and the pair of rotation stopper projections 55 are inserted into shaft insertion holes 63 of the cassette 61 and then fitted to the hubs to prevent the magnetic tape T from slackening.

Projections 57 are also formed on the right and left side wall portions 54a, while engaging recesses 58 corresponding to the projections 57 are formed on the right and left side wall portions 53a. When the cover member 52 and the casing member 53 are closed, the projections 57 engage with the engaging recesses 58 to lock the cover member 52 and the casing member 53 together.

Further, portions A and A', which are flat plate portions of the cover member 52 and of the casing member 53 confronting each other on the upper and lower surfaces of the magnetic tape cassette 61 and which exclude the peripheral portions B and B' of the magnetic tape cassette 61, are molded with the transparent GPPS resin, while the peripheral portions B and B' (shown shaded in FIG. 5) are molded using a highly slidable resin having silicon oil added to HIPS.

Since the portions apt to be rubbed when the magnetic tape cassette 61 is inserted in the case and the portions apt to be scraped, such as the engaged portions between the support projections 56 and the fitting holes, and the fitted and between held portions between the projections 57 and the engaging recesses 58, are molded with a synthetic resin having an acceptable sliding property, not only the magnetic tape cassette accommodating case 51 but also the magnetic tape cassette 61 are not scraped, thus reducing the total amount of scrapings. Further, since the flat plate portions A and A', excluding the peripheral portions B and B' corresponding to the thickened portion of the tape cassette, are transparent, messages on label or index card of the accommodated magnetic tape cassette 61 can be easily observed.

Therefore, with the inventive cassette accommodating case, there is no likelihood that scrapings will adhere to the magnetic tape when the magnetic tape cassette accommodating case 51 is stored or carried with the magnetic tape cassette 61 accommodated therein, thereby eliminating the cause of dropout of the reproduction output.

While the above-mentioned magnetic tape cassette accommodating case is molded with two kinds of synthetic resins, this type of molding can be implemented by two-color molding by using molds as will be described below.

Another embodiment of the invention will be described next with reference to FIG. 5A.

This embodiment is an exemplary application to thin magnetic tape cassette accommodating cases 81 (hereinafter referred to as "thin case") which are of recent design. A magnetic tape cassette to be received in the thin case 81 is represented by the magnetic tape cassette 61 shown in FIG. 5.

A cover member 82 constituting the thin case 81 has a pocket 83. The pocket 83 or the thin cage 81 is to receive the rear end portion of the magnetic tape cassette 61, not its thickened portion 62. On an opening end portion of the cover member 82 is formed a trapezoidal recess 84 so as to receive the thickened portion 62.

On the other hand, on the casing member 85 are formed a pair of rotation stopper projections 86, and a trapezoidal recess 87 is formed at a position confronting the trapezoidal recess 84 when the casing member 86 and the cover member 82 are closed.

When the magnetic tape cassette 61 is placed in the thin case 81 and the cover member 82 and the casing member 85 are closed thereafter, the thickened portion 62 is received within the trapezoidal recesses 84, 87. Therefore, the thickness of the case can be reduced substantially compared to a case of conventional structure due to the recesses 84, 87.

The cover member 82 and the casing member 85 are pivotably supported by the pivots 88 so as to be opened and closed freely. On right and left side wall portions 83a of the pocket 83 are formed projections 89, while on right and left side wall portions 85a of the casing member 85 are formed engaging recesses 90. Accordingly, when the cover member 82 and the casing member 85 are closed, the projections 89 are engaged with respective ones of the engaging recesses 90 so that the cover member 82 and the casing member 83 are held closed.

Figure 5A:
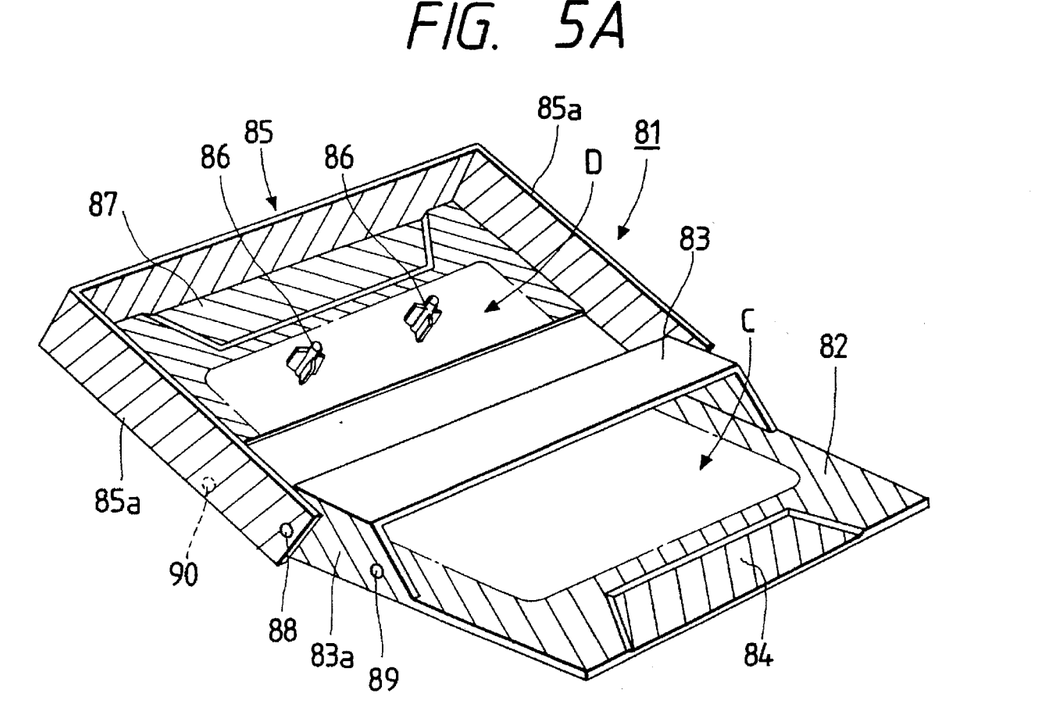
FIG. 5A is a perspective view of a magnetic tape cassette accommodating case produced in accordance with another embodiment of the present invention.

Further, also in the thin case 81, portions C and D, which are flat plate portions of the cover member 82 and of the casing member 85 confronting the lower and upper surfaces of the magnetic tape cassette 61 and which exclude at least the regions corresponding to the thickened portion 62 of the magnetic tape cassette 61, are molded with the transparent GPPS resin, and the portions shown by shading in FIG. 5A are molded with a resin prepared by adding silicon oil to highly slidable HIPS.

Therefore, likewise in this embodiment, since the portions apt to rubbed when the magnetic tape cassette 61 is being put in the case (particularly the trapezoidal recesses 84, 87) and the portions apt to scraped (such as the portions at which the support projections 88 and the through holes engage each other and the fitted and held portions between the projections 89 and the engaging recesses 90) are molded with a highly slidable synthetic resin, the production of scrapings is markedly reduced. In addition, since the portions C, D (excluding the regions corresponding to the thickened portion 62 of the magnetic tape cassette 61) are transparent, messages on a label or index card of the magnetic tape cassette 61 are readily visible.

The magnetic tape cassette accommodating case according to the present invention has the feature that the flat plate portions of the cover member and of the casing member confronting the thickened portion of a magnetic tape cassette to be accommodated and the side wall portions of the cover member and the casing member including the pivotably attached portions are molded with a resin that is more slidable than the other portions molded with a transparent resin so as to allow the contents to be visible from outside the case.

In other words, since the portions apt to rubbed when the magnetic tape cassette is being put in the case and the portions apt to be scraped when the case is being opened and closed are molded with a highly slidable synthetic resin, production of scrapings that hamper satisfactory recording and reproduction from the magnetic tape are reduced. Further, since the portions through which messages on a label or index card of the magnetic tape cassette are to be observed are molded with a transparent synthetic resin, such messages are readily visible.

Accordingly, a satisfactory magnetic tape cassette accommodating case which allows a magnetic tape cassette to be visibly checked and which causes production of scrapings to be reduced can be provided.

Figure 1:
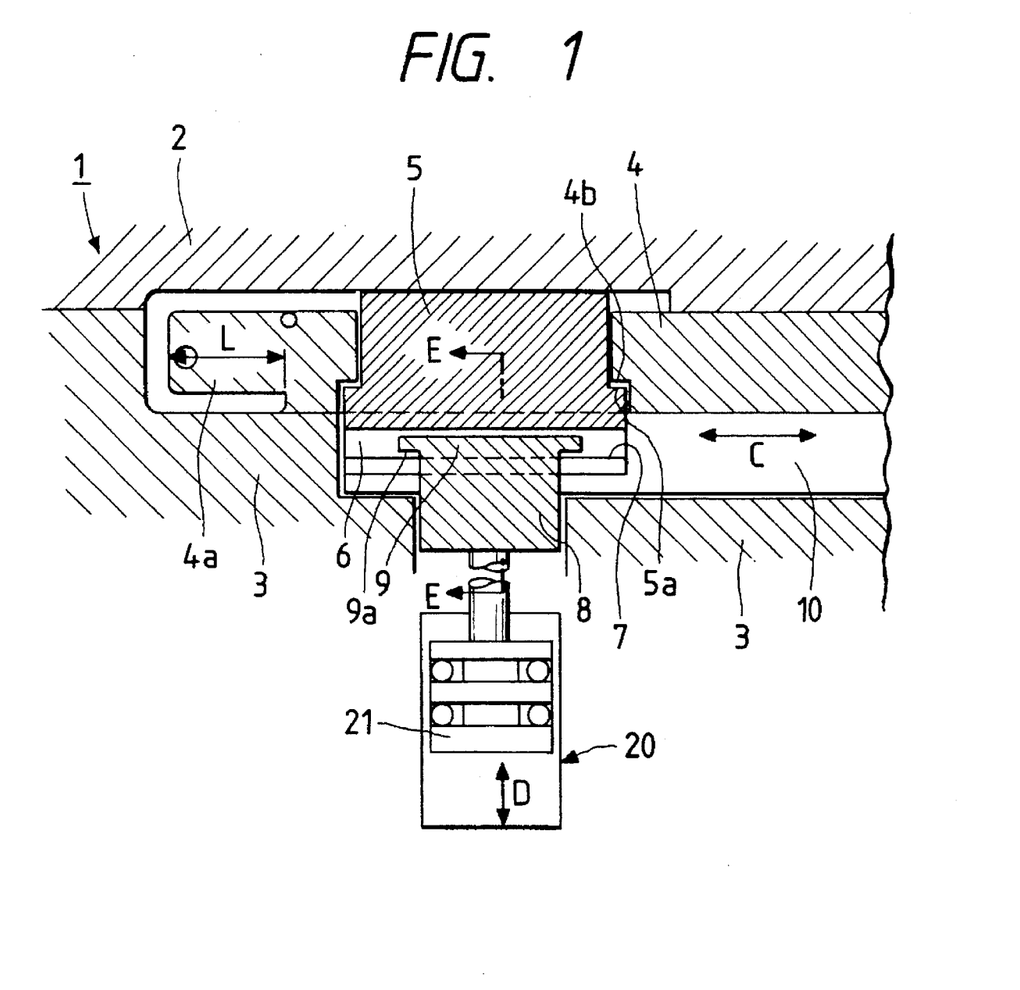
FIG. 1 is a sectional view showing a main portion of molds used to form a magnetic tape cassette accommodating case of the present invention, the sectional view also showing a first step of an injection molding process.

The apparatus 1 shown in FIG. 1 is a molding apparatus for molding a cover member 52 of the case 51. Respective injection gates thereof are not shown for convenience.

Figure 2:
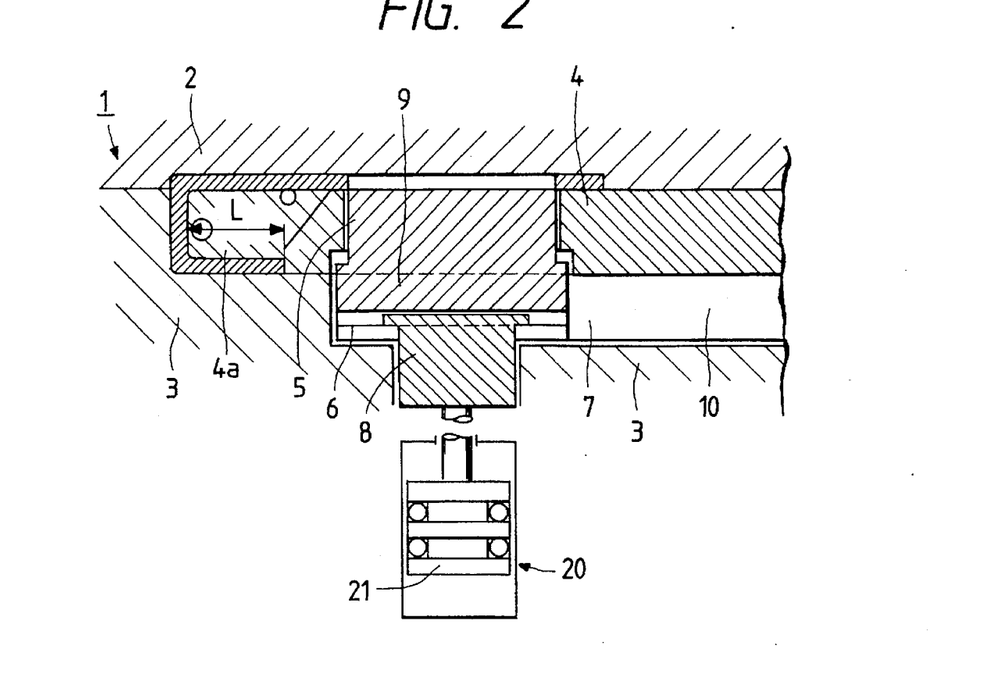
FIG. 2 is a sectional view showing a main portion of the molds used to form the magnetic tape cassette accommodating case of the present invention, the sectional view also showing a second step of the injection molding process.
Figure 3:
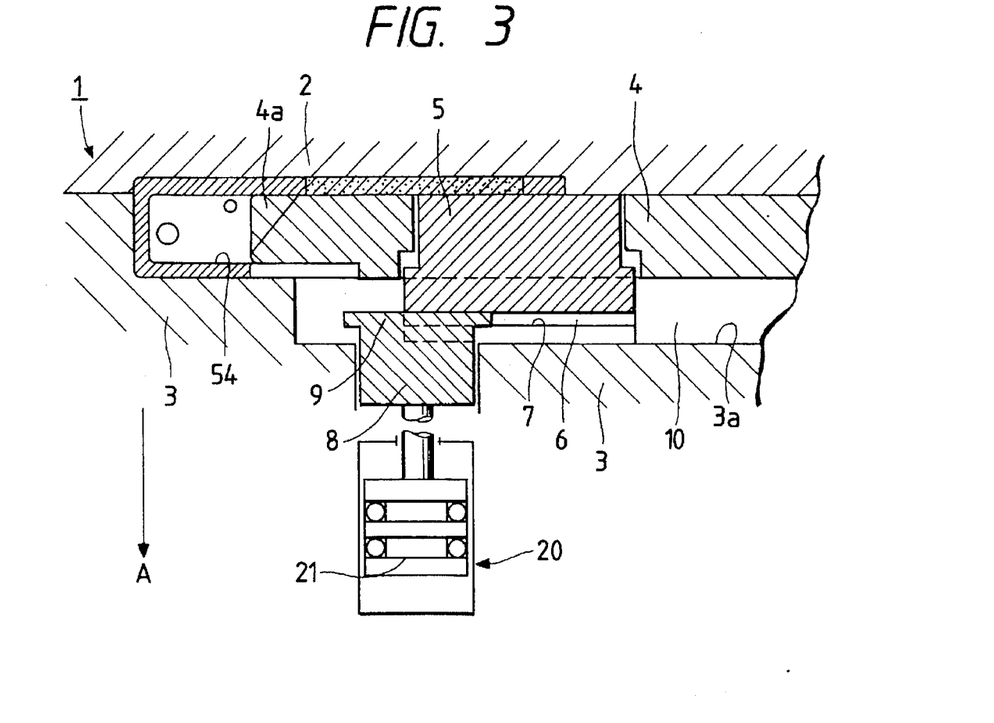
FIG. 3 is a sectional view showing a main portion of the molds used to form the magnetic tape cassette accommodating case of the present invention, the sectional view also showing a third step of the injection molding process.

In the molds shown in these drawings, a fixed mold 2, a movable mold 3, and a first slide core 4 form a cavity (injection space). Within the first slide core 4 is a second slide core 5 that slides within the first slide core 4.

The first slide core 4 defining the inner side of the cover member 52 is arranged so as to be movable in a direction corresponding to a direction of inserting the cassette (the direction indicated by an arrow C in FIG. 1). The second slide core 5 slidably located within the first slide core 4 is moved by a drive device 20 implemented with, e.g., a hydraulic cylinder. The second slide core 5 moves in a direction substantially orthogonal to the direction of moving the first slide core 4. The drive device 20 and the second slide core 5 are connected to each other through a coupling member 8.

The lower end portion of the second slide core 5 and the coupling member 8 are slidably fitted with each other. That is, on the lower end portion of the second slide core 5 is formed a groove-like core side engaging portion 6 having a slide engaging surface 7 extending along the direction of moving the first slide core 4 (the direction indicated by the arrow C), the groove-like core side engaging portion 6 being expanded in the depth direction. On the coupling member 8 is formed a substantially T-shaped drive side engaging portion 9 having a confronting engaging surface 9a that is slidably engageable with the slide side engaging surface 7.

The first slide core 4 is arranged so that an end portion 4a of the first slide core 4 slides such a distance as to evacuate a portion corresponding to the pocket 54 (at least a distance longer than L). For smooth sliding movement, it is desirable to have the structure wherein engagement between the lower end portion of the second slide core 5 and the coupling member 8 is maintained when the first slide core 4 has moved toward the right (the state shown in FIG. 3), compared to a structure where engagement and disengagement are repeated.

A molding process using the thus-constructed molding apparatus 1 will be described.

Figure 4:
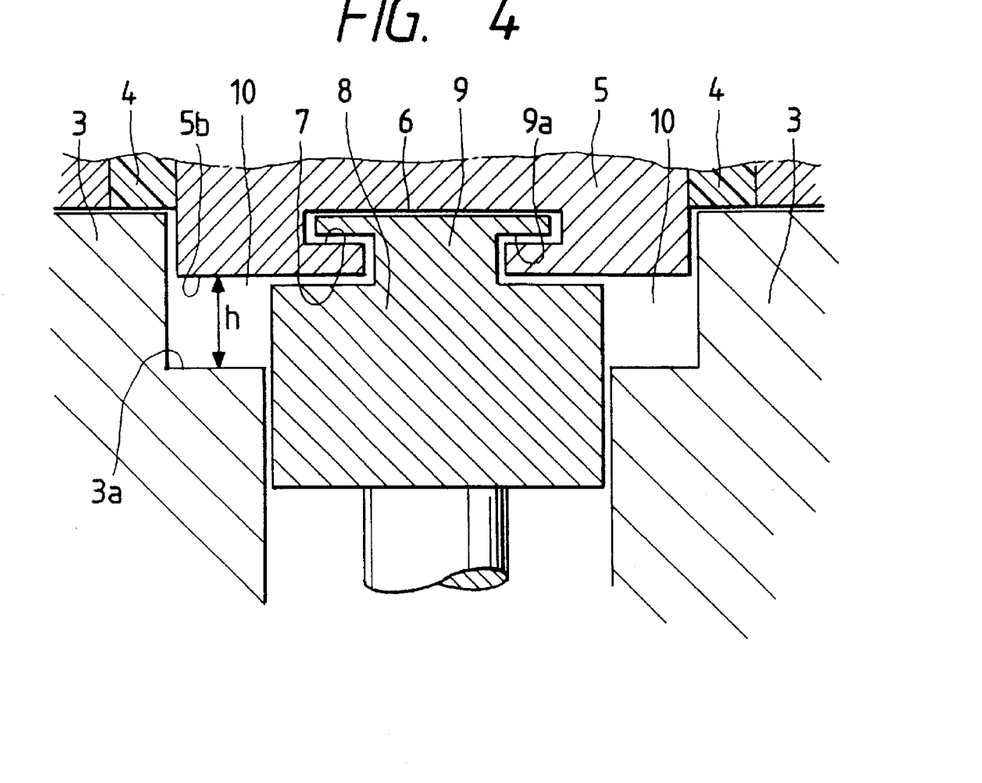
FIG. 4 is a sectional view showing a portion taken along a lane E—E shown in FIG. 1.

As shown in FIGS. 1 to 4, a first resin is injected from a gate (not shown) with the second slide core 5 being extended into the cavity from the first slide core 4. The positioning of the second slide core 5 under this condition can be accomplished by causing a stepped portion 4b of the first slide core 4 to be abutted against a shoulder portion 5a of the second slide core 5. After the first resin is appropriately solidified, the second slide core 5 is retracted (moved downward in FIG. 1) to form another cavity. The retracting distance h can be set by causing the surface of a stopped portion 3a of a movable mold 3 to abut against a lower end surface 5b of the second slide core 5, both members 3a, 5b defining a space 10 for moving the second slide core 5 as shown in FIG. 4. That is, the distance h in FIG. 4 is set to the thickness of each portion constituting the case.

After a second resin has been injected from another other gate to another cavity and the second resin has been appropriately solidified, the first slide core 4 is slid to a portion from which the end portion 4a is pulled out from the pocket 54 together with the second slide core 5. Thereafter, the movable mold 3 is moved in a direction A (downward in FIG. 1) to extract the cover member 52 from the molds.

The casing member 53 is molded so that the edge portion B' and the portion A' are molded with the same resins as the portion A and the portion B, respectively, of the cover member 52. The slide core used to mold the casing member may be of such a structure that the molds have a slide core moving in a direction of thickness of the case.

While the cassette accommodating case of the type where the front opening portions 62 of a cassette is inserted into the pocket 54 has been described, the invention may of course be applied to the cassette accommodating thin cases in which the rear end portion or side portion of a cassette is inserted into the pocket.

Further, in the invention the second slide core and its drive device are engaged not only in the manner shown in FIG. 4, but this engagement may also be implemented in a manner reverse to that shown in FIG. 4. The fitted shape may also be modified in various ways. Further, it goes without saying that a structure in which a plurality of second slide cores are provided may also be acceptable. In other words, the case of the invention is not limited to the structure shown in FIG. 5, but may take various forms.

As described above, in accordance with the invention, the first slide core that defines the inner surfaces of the cover member is arranged so as to be movable in the direction of inserting a cassette, and the second slide core is movable within the first slide core in a direction orthogonal to the direction of moving the first slide core, with the engagement between the second slide core and the means for driving the second slide core being such as to allow the first slide core to move. Therefore, even if the first slide core moves, the coupling structure between the second slide core and its drive means is not complicated. This coupling structure also enables the molding steps to be comparatively simple despite the fact that the second slide core performs such a complicated operation as two-step movement, thus contributing to downsizing the molds. The invention further provides not only a method for manufacturing a cassette accommodating case by means of two-color molding that is featured by a simple and highly productive process, but also an apparatus for manufacturing such a case.

The magnetic tape cassette accommodating case of the invention has the feature that the peripheral portions of the cover member and of the casing member confronting the thickened portion of a magnetic tape cassette to be accommodated, and the side wall portions of the cover member and of the casing member including the pivotably attached portions, are molded with a resin that is more slidable than the other portions molded using a transparent resin, allowing the contents of the case to be clearly visible from outside the case.

Thus, the portions apt to be rubbed when the magnetic tape cassette is being put in the case and the portions easily scraped when the case is being opened and closed are molded with a highly slidable synthetic resin, so that production of scrapings that hamper satisfactory recording into and reproduction from the magnetic tape can be reduced. In addition, since the portions which allow messages on a label or index card of the magnetic tape cassette to be seen are molded with a transparent synthetic resin, these messages are clearly visible.

What is claimed is:

1. In a method for forming a magnetic tape cassette accommodating case comprising a cover member having a pocket for receiving a portion of a magnetic tape cassette and a casing member confronting said cover member, said cover member and said casing member being pivotally assembled so as to be opened and closed freely, wherein a first slide core defining inner wall surfaces of a cavity for forming said cover member is provided so as to be slidable in a direction of inserting a cassette, a second slide core is provided so as to be movable in said first slide core substantially orthogonally to said direction of moving said first slide core, said method comprising the steps of:

projecting said second slide core from said first slide core into the cavity for forming said cover member;

determining a position of said second slide core relative to said first slide core in said projecting step by abutting a stepped portion of said first slide core against a shoulder portion of said second slide core;

injecting a first resin into the cavity;

retracting said second slide core to form another cavity;

injecting a second resin into said another cavity;

thereafter, retracting said first slide core together with said second slide core in said direction of moving said first slide core;

retracting said first and second slide cores along a line substantially orthogonally to said direction of moving said first slide core, thereby opening the cavity; and ejecting the thus formed cover member.

2. A method for forming a magnetic tape cassette accommodating case as recited in claim 1, wherein in said steps of injecting said first and second resins, said first and second resins are comprised of different materials.

3. A method for forming a magnetic tape cassette accommodating case as recited in claim 1, wherein said step of retracting said second slide core is performed after said first resin is appropriately solidified.

4. A method for forming a magnetic tape cassette accommodating case as recited in claim 1, wherein said step of retracting said first slide core together with said second slide core is performed after said second resin is appropriately solidified.

5. A method for forming a magnetic tape cassette accommodating case as recited in claim 1, wherein in said step of retracting said second slide core, said second slide core is retracted by a distance equal to a thickness of the cover member.

6. A method for forming a magnetic tape cassette accommodating case as recited in claim 1, wherein in said step of retracting said first slide core together with said second slide core, said first slide core is retracted by a distance sufficient to remove an end portion of the first slide core from the pocket of the cover member.

7. In a method for forming a magnetic tape cassette accommodating case comprising a cover member having a pocket for receiving a portion of a magnetic tape cassette and a casing member confronting said cover member, said cover member and said casing member being pivotally assembled so as to be opened and closed freely, wherein a first slide core defining inner wall surfaces of a cavity for forming said cover member is provided so as to be slidable in a direction of inserting a cassette, a second slide core is provided so as to be movable in said first slide core substantially orthogonally to said direction of moving said first slide core, said method comprising the steps of:

projecting said second slide core from said first slide core into the cavity for forming said cover member;

injecting a first resin into the cavity;

retracting said second slide core to form another cavity;

injecting a second resin into said another cavity;

thereafter, retracting said first slide core together with said second slide core in said direction of moving said first slide core;

retracting said first and second slide cores along a line substantially orthogonally to said direction of moving said first slide core, thereby opening the cavity; and ejecting the thus formed cover member;

wherein said steps of projecting and retracting said second slide core are performed using a drive means slidably engaged with said second slide core, and wherein said step of retracting said first slide core together with said second slide core comprises a step of maintaining slidable engagement between said second slide core and said drive means.

8. In a method for forming a magnetic tape cassette accommodating case comprising a cover member having a pocket for receiving a portion of a magnetic tape cassette and a casing member confronting said cover member, said cover member and said casing member being pivotally assembled so as to be opened and closed freely, wherein a first slide core defining inner wall surfaces of a cavity for forming said cover member is provided so as to be slidable in a direction of inserting a cassette, a second slide core is provided so as to be movable in said first slide core substantially orthogonally to said direction of moving said first slide core, and a movable mold is provided which cooperates with said first slide core, said method comprising the steps of:

projecting said second slide core from said first slide core into the cavity for forming said cover member;

injecting a first resin into the cavity;

retracting said second slide core to form another cavity;

injecting a second resin into said another cavity;

thereafter, retracting said first slide core together with said second slide core in said direction of moving said first slide core;

determining a position of said second slide core relative to said first slide core when said first slide core is retracted together with said second slide core by abutting a lower end surface of said second slide core against a surface of a stopped portion of the movable mold;

retracting said first and second slide cores along a line substantially orthogonally to said direction of moving said first slide core, thereby opening the cavity; and ejecting the thus formed cover member.

* * * * *